(12) United States Patent
Herke et al.

(10) Patent No.: US 10,131,239 B2
(45) Date of Patent: Nov. 20, 2018

(54) CHARGING STATION AND METHOD FOR CHARGING A PLUG-IN MOTOR VEHICLE AT A CHARGING POST

(71) Applicant: Dr. Ing. h.c. F. Porsche Aktiengesellschaft, Stuttgart (DE)

(72) Inventors: Dirk Herke, Kirchheim unter Teck (DE); Ralf Oestreicher, Sindelfingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 75 days.

(21) Appl. No.: 15/189,024

(22) Filed: Jun. 22, 2016

(65) Prior Publication Data

US 2016/0375781 A1    Dec. 29, 2016

(30) Foreign Application Priority Data

Jun. 23, 2015   (DE) .................. 10 2015 110 023

(51) Int. Cl.
*H02J 7/00* (2006.01)
*B60L 11/18* (2006.01)

(52) U.S. Cl.
CPC ....... *B60L 11/1838* (2013.01); *B60L 11/1811* (2013.01); *B60L 11/1816* (2013.01); *B60L 11/1825* (2013.01); *B60L 2210/40* (2013.01); *B60L 2230/30* (2013.01); *Y02T 10/7005* (2013.01); *Y02T 10/7088* (2013.01); *Y02T 10/7241* (2013.01); *Y02T 90/121* (2013.01);
(Continued)

(58) Field of Classification Search
CPC .............. B60L 11/1811; B60L 11/1816; B60L 11/1825; B60L 11/1838; B60L 2210/40; B60L 2230/30; Y02T 10/7005; Y02T 10/7088; Y02T 10/7241; Y02T 90/121; Y02T 90/127; Y02T 90/128; Y02T 90/14; Y02T 90/163
See application file for complete search history.

(56) References Cited

U.S. PATENT DOCUMENTS 5,184,058 A  *  2/1993  Hesse ................. B60L 11/1816
                                                               320/109
7,256,516 B2    8/2007  Buchanan et al.
(Continued)

FOREIGN PATENT DOCUMENTS

| CN | 102290841 A | 12/2011 |
|---|---|---|
| WO | 2013/039753 | 3/2013 |

OTHER PUBLICATIONS

Chinese Office Action dated April 2, 2018.

*Primary Examiner* — Vuthe Siek
(74) *Attorney, Agent, or Firm* — Gerald E. Hespos; Michael J. Porcos; Matthew T. Hespos

(57) ABSTRACT

A charging station (10) for charging a plug-in motor vehicle (24) at a charging post (12) has a power transformer (14) and rectifier modules (16). The power transformer (14) has terminal leads (18) that are DC-isolated on the secondary side. The terminal leads (18) are connected at least partially to the rectifier modules (16). The power transformer (14) and the rectifier modules (16) are configured so that the rectifier modules (16) emit a low DC voltage when the power transformer (14) is fed with a medium voltage.

11 Claims, 2 Drawing Sheets

(52) U.S. Cl.
CPC ............ *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2010/0276999 A1* | 11/2010 | Gow | H02K 7/1853 307/64 |
| 2012/0326668 A1 | 12/2012 | Ballatine et al. | |
| 2013/0020989 A1 | 1/2013 | Xia et al. | |
| 2013/0069592 A1* | 3/2013 | Bouman | B60L 11/1811 320/109 |
| 2013/0221921 A1 | 8/2013 | Ang | |
| 2014/0104891 A1* | 4/2014 | Kim | H02M 3/33569 363/20 |
| 2014/0232301 A1 | 8/2014 | Dittmer et al. | |
| 2014/0292297 A1* | 10/2014 | Jutras | H02M 3/335 323/282 |
| 2015/0074431 A1* | 3/2015 | Nguyen | H02J 3/006 713/300 |
| 2015/0267946 A1* | 9/2015 | Lowstuter, Jr. | F25B 27/005 62/235.1 |

* cited by examiner

CHARGING STATION AND METHOD FOR CHARGING A PLUG-IN MOTOR VEHICLE AT A CHARGING POST

CROSS REFERENCE TO RELATED APPLICATION

This application claims priority under 35 USC 119 to German Patent Appl. No. 10 2015 110 023.1 filed on Jun. 23, 2015, the entire disclosure of which is incorporated herein by reference.

BACKGROUND

1. Field of the Invention

The invention relates to a charging station for charging a plug-in motor vehicle at a charging post. The invention also relates to a method.

2. Description of the Related Art

Stationary systems are known for electrically supplying stationary DC voltage charging posts that will supply the traction battery of a plug-in vehicle—hybrid or electric vehicle—with DC voltage. It is also known to supply individual charging posts from the stationary AC power supply system, typically at a low voltage of around 400 volts. Each individual charging post has its own AC/DC converter for providing DC voltage. In addition, it is already known practice to use staged power distribution using a plurality of AC/DC converters in the form of charging devices.

U.S. Pat. No. 7,256,516 B2 describes a charging system for simultaneously charging the batteries of a multiplicity of battery-operated vehicles. Charging comprises one or more DC/DC power converters having one or more charging connections designed to connect them to the batteries. Each DC/DC power converter is configured to be connected selectively to more than one charging connection for selectively providing higher connection power levels. The DC/DC power converters are connected to a rectifier by means of an intermediate circuit. The rectifier is connected to an alternating current source with limited power.

WO 2013/039753 A1 describes a method for energy management using different AC sources.

US 2014/0232301 A1 discloses a method for charging inverters.

US 2013/0221921 A1 describes a vehicle.

US 2012/0326668 A1 relates to a fuel cell.

SUMMARY

The invention provides a charging station for charging a plug-in motor vehicle at a charging post and a corresponding method.

The proposed approach is based on the knowledge that higher charging powers will be required in future and the number of charging posts required for each charging station will increase. This shows the cost and strategic advantage of this invention.

The invention provides flexible expandability and is configured so that all of the vehicles charged by the charging station are galvanically decoupled from one another. The low procurement costs of the charging posts should also be mentioned. Finally, the charging process according to the invention is not subject to any system-inherent power restriction since the supply is not effected from a low-voltage network that typically has a current limit of 120 A three-phase current for a voltage of 400 V.

Further advantages of the invention in comparison with that which was previously known comprise a considerable cost advantage, a sufficient charging power, flexible power distribution among the posts and the simple expansion up to the maximum power $P_{max}$.

The charging station may comprise a buffer store with feedback capability, and one of the terminal leads of the power transformer may be connected to the buffer store. Such an energy store can intercept peak loads.

Provision may also be made for the rectifier modules to comprise a mains filter in the form of a power factor correction filter (power factor correction, PFC), for example, and increases the so-called power factor so that it remains in a legally prescribed range. Such a refinement improves, in particular, the standardized electromagnetic compatibility (EMC) of the described charging station.

The charging station also may comprise at least one insulation monitor, and a separate insulation monitor may be provided for each vehicle charged by the charging station. In the event of a fault, if the insulation fault current is exceeded, a warning can therefore be emitted or the relevant network outgoer can be disconnected.

Finally, the rectifier modules may be combined to form a multi-pole direct current busbar (direct current busbar, DC bus) that proves advantageous for the clarity and ease of maintenance of the station.

Two exemplary embodiments of the invention are illustrated in the drawings and are described in more detail below.

DETAILED DESCRIPTION

Figure 1:
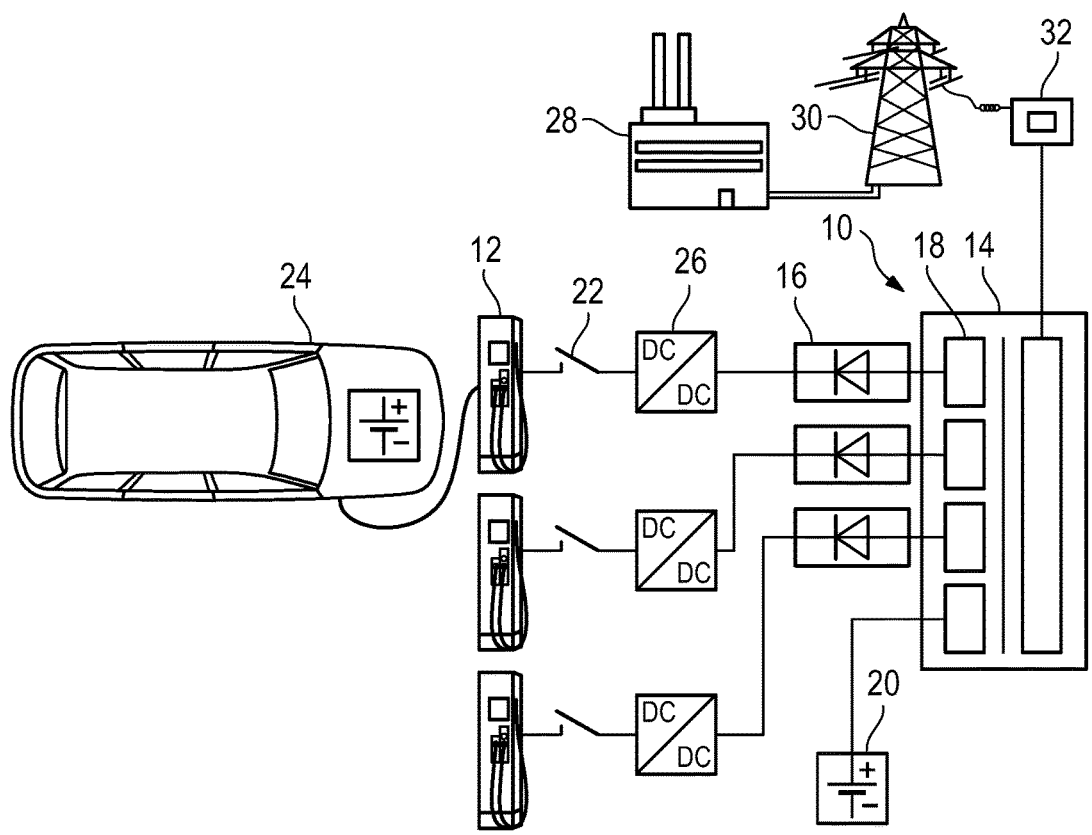
FIG. 1 is a schematic illustration of a first embodiment.

FIG. 1 illustrates the simplified structure of a charging station 10 for charging a plug-in motor vehicle 24 at one of three charging posts 12 according to a first embodiment of the invention. The charging station 10 comprises a power transformer 14 having an insulation monitor and safety measures. The power transformer 14 is fed with a medium voltage of 20 kV, for example, by an upstream transformer 32 of the medium-voltage network. The transformer is in turn fed from a power plant 28 via an extra-high-voltage and high-voltage network 30 operated with voltages of between 110 and 380 kV.

The charging station 10 provided as the central high-power DC/DC converter 26 also comprises three rectifier modules 16 that are connected to three galvanically isolated terminal leads 18 of the power transformer 14 and are combined to form a multi-pole busbar to provide an intermediate network having a total power of 600 kW. A fourth rectifier module 16 is connected to a buffer store 20 with feedback capability in the charging station 10. In this case, a power factor correction filter of the rectifier modules 16 acts as the mains filter of the charging station 10.

The power transformer 14 and the rectifier modules 16 are configured so that the rectifier modules 16 emit a low DC voltage of between 950 V and 2000 V, preferably 1000 V, if the power transformer 14 is fed with a medium voltage of 20 kV. This as yet unregulated low DC voltage is adapted to the charging voltage of the motor vehicle 24, that is between 200 and 1000 V, but preferably 800 V, by means of one of three simple step-down DC/DC converters 26 in the infrastructure. The charging post 12 delivers this stabilized charging voltage to the motor vehicle 24 under the control of a switch 22 and with a charging power of 150 kW to charge the motor vehicle.

Figure 2:
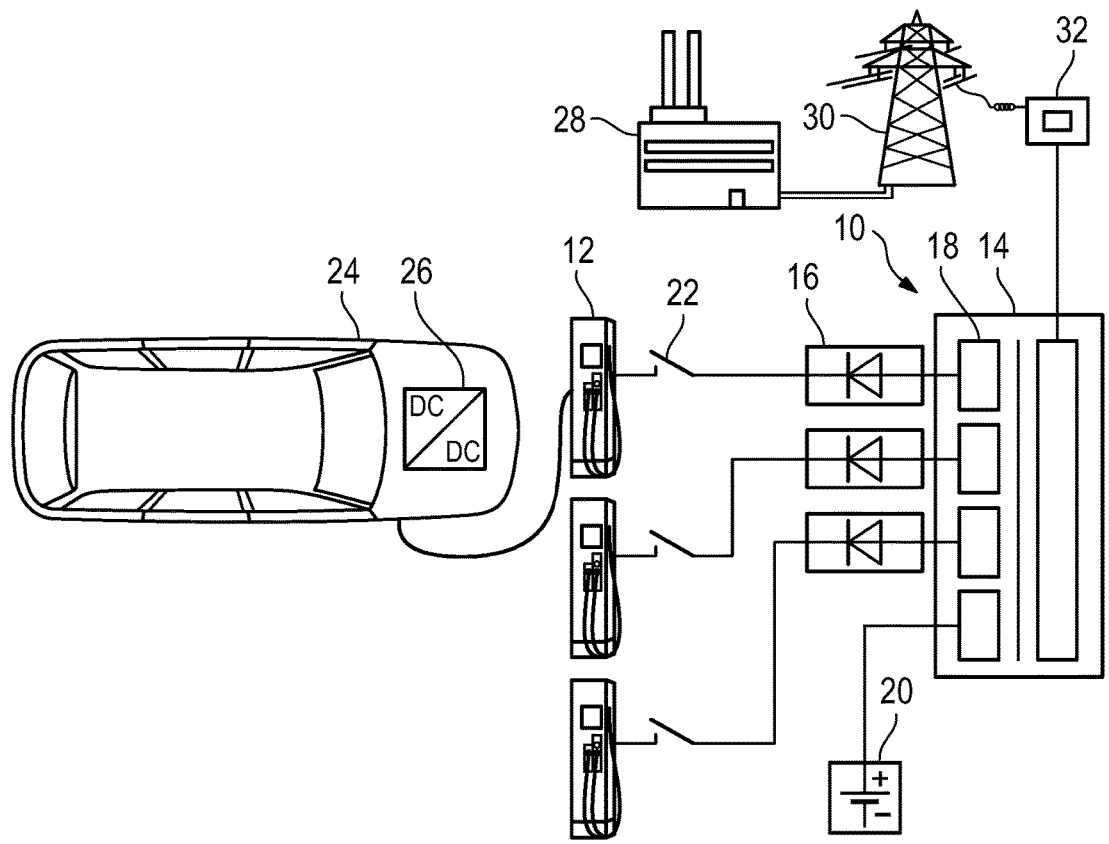
FIG. 2 is a schematic illustration of a second embodiment.

The adaptation of the low DC voltage is resolved differently in the case of a second embodiment of the invention illustrated in FIG. 2. In this case, the charging post 12 provides the as yet unregulated low DC voltage. As a result, the low DC voltage must be adapted by the motor vehicle 24. For this purpose, the motor vehicle 24 comprises its own step-down DC/DC converter 26.

What is claimed is:

1. A charging station for charging a plug-in motor vehicle at one of a plurality of charging posts, comprising:
   a power transformer including galvanically isolated secondary windings,
   rectifier modules, wherein each rectifier module is connected to a separate galvanically isolated secondary winding of the power transformer and each rectifier module is coupled to a separate charging post of the plurality of charging posts, and
   wherein the power transformer and the rectifier modules are configured such that the rectifier modules emit a low DC voltage when the power transformer is fed with a medium voltage.

2. The charging station of claim 1, further comprising:
   a storage with feedback capability for intercepting peak loads, and
   one of the galvanically isolated secondary windings is connected to the storage.

3. The charging station of claim 1, further comprising a mains filter.

4. The charging station of claim 3, wherein the mains filter is a power factor correction filter of the rectifier modules.

5. The charging station of claim 1, further comprising an insulation monitor.

6. The charging station of claim 1, wherein the rectifier modules are combined to form a multi-pole busbar.

7. The charging station of claim 1, wherein the charging station is configured so that the low DC voltage is between 950 V and 2000 V when the medium voltage is 20 kV.

8. A method for charging a plug-in motor vehicle at a charging post using the charging station of claim 1, comprising:
   feeding the charging station with a medium voltage,
   emitting an unregulated low DC voltage from the charging station, adapting the low DC voltage to the motor vehicle, and
   charging the motor vehicle with the adapted low DC voltage.

9. The method of claim 8, wherein:
   the low DC voltage is adapted in an infrastructure of the charging station, and the charging post provides the adapted low DC voltage.

10. The method of claim 8, wherein:
    the charging post provides the unregulated low DC voltage to the motor vehicle, and the low DC voltage is adapted by the motor vehicle.

11. The charging station of claim 1, wherein each rectifier module is coupled to a separate charging post via a step-down DC/DC converter, each step-down DC/DC converter configured to adapt the low DC voltage emitted by the corresponding rectifier module to a motor vehicle at the corresponding charging post.

* * * * *